US012730724B2

(12) United States Patent
Cao et al.

(10) Patent No.: US 12,730,724 B2
(45) Date of Patent: Sep. 8, 2026

(54) METADATA TREE SNAPSHOT METHOD AND APPARATUS, METADATA TREE QUERY METHOD AND APPARATUS, AND ELECTRONIC DEVICE

(71) Applicant: Baidu International Technology (Shenzhen) Co., Ltd., Shenzhen (CN)

(72) Inventors: Biao Cao, Shenzhen (CN); Jiwei Xiong, Shenzhen (CN); Yiduo Wang, Shenzhen (CN); Qiushi Chen, Shenzhen (CN); Yan Xing, Shenzhen (CN)

(73) Assignee: Baidu International Technology (Shenzhen) Co., Ltd., Shenzhen (CN)

( * ) Notice: Subject to any disclaimer, the term of this patent is extended or adjusted under 35 U.S.C. 154(b) by 48 days.

(21) Appl. No.: 18/897,115

(22) Filed: Sep. 26, 2024

(65) Prior Publication Data

US 2025/0094288 A1 Mar. 20, 2025

(30) Foreign Application Priority Data

Oct. 16, 2023 (CN) ........................ 202311344294.5

(51) Int. Cl.
*G06F 16/24* (2019.01)
*G06F 11/1446* (2026.01)
(Continued)

(52) U.S. Cl.
CPC ...... *G06F 11/1451* (2013.01); *G06F 16/2343* (2019.01); *G06F 16/24535* (2019.01); *G06F 2201/80* (2013.01)

(58) Field of Classification Search
None
See application file for complete search history.

(56) References Cited

U.S. PATENT DOCUMENTS 9,824,095 B1 * 11/2017 Taylor ..................... G06F 16/11
2009/0106255 A1 * 4/2009 Lacapra ............. G06F 11/1076
(Continued)

FOREIGN PATENT DOCUMENTS

CN 108572888 A 9/2018
CN 110515774 A 11/2019
(Continued)

OTHER PUBLICATIONS

First Office Action in CN Patent Application No. 202311344294.5 dated Feb. 10, 2026.

*Primary Examiner* — Eliyah S. Harper
(74) *Attorney, Agent, or Firm* — Dilworth IP, LLC

(57) ABSTRACT

The present disclosure provides a metadata tree snapshot method and apparatus, a metadata tree query method and apparatus, and an electronic device, and relates to the field of data processing technology, and in particular to the field of cloud computing and cloud database technology. The specific realization scheme is as follows: acquiring a basic metadata tree and a first incremental metadata tree, where the basic metadata tree is created based on first snapshot data, the basic metadata tree is locked after being created, the first snapshot data is created at a previous snapshot time instant, and the first incremental metadata tree is created based on a metadata change operation after the basic metadata tree is created; locking the first incremental metadata tree in response to reaching a current snapshot time instant; and creating second snapshot data based on the basic metadata tree and the locked first incremental metadata tree.

18 Claims, 4 Drawing Sheets

Acquire a basic metadata tree and a first incremental metadata tree, where the basic metadata tree is created based on first snapshot data, the basic metadata tree is locked after being created, the first snapshot data is created at a previous snapshot time instant, and the first incremental metadata tree is created based on a metadata change operation after the basic metadata tree is created — S710

↓

Determine a second metadata query result based on the basic metadata tree and the first incremental metadata tree in response to receiving a second metadata query request — S720

(51) Int. Cl.
*G06F 16/23* (2019.01)
*G06F 16/2453* (2019.01)

(56) References Cited

U.S. PATENT DOCUMENTS

2015/0269194 A1* 9/2015 King ................... G06F 11/3698 707/805
2016/0070480 A1* 3/2016 Babu ................... G06F 16/2246 711/114
2016/0210302 A1* 7/2016 Xia ..................... G06F 16/1724
2016/0335278 A1* 11/2016 Tabaaloute ............ G06F 16/128
2017/0192710 A1* 7/2017 Pundir .................. G06F 3/0644
2017/0212680 A1* 7/2017 Waghulde ............... G06F 3/061
2017/0235848 A1* 8/2017 Van Dusen ............ G06Q 10/10 705/12
2017/0371889 A1* 12/2017 Golander .............. G06F 16/275
2018/0336222 A1* 11/2018 Bourgeois ............. G06F 16/185
2020/0125450 A1* 4/2020 Aron ................... G06F 16/2246
2020/0226035 A1* 7/2020 Li ....................... G06F 11/1446
2020/0349138 A1* 11/2020 Qiu ..................... G06F 16/2246
2020/0409977 A1* 12/2020 Yang ..................... G06F 16/275
2022/0027187 A1 1/2022 Wang et al.
2022/0155962 A1* 5/2022 Mundra .............. G06F 11/1451
2023/0273897 A1* 8/2023 Van Dyck ............. G06F 16/113 707/665
2023/0325352 A1* 10/2023 Liu ....................... G06F 3/0652 707/822
2025/0086120 A1* 3/2025 Raff .................... G06F 12/1081
2025/0103490 A1* 3/2025 Seibel ................... G06F 12/023

FOREIGN PATENT DOCUMENTS

CN 113868273 A 12/2021
CN 116401207 A 7/2023

* cited by examiner

METADATA TREE SNAPSHOT METHOD AND APPARATUS, METADATA TREE QUERY METHOD AND APPARATUS, AND ELECTRONIC DEVICE

CROSS-REFERENCE TO RELATED DISCLOSURE

This application claims priority to Chinese Patent Application No. 202311344294.5, filed on Oct. 16, 2023, which is hereby incorporated by reference in its entirety.

TECHNICAL FIELD

The present disclosure relates to the field of data processing technology, and in particular to the field of cloud computing and cloud database technology, and more specifically, the present disclosure relates to a metadata tree snapshot method and apparatus, a metadata tree query method and apparatus, and an electronic device.

BACKGROUND

A metadata tree is a tree-type data structure built based on metadata, which is used to implement the management of metadata.

The metadata tree requires periodic snapshot operations in order to recover the metadata tree quickly when the system fails. How to effectively create a snapshot of the metadata tree has become an important technical problem.

SUMMARY

In order to solve at least one of the above shortcomings, the present disclosure provides a metadata tree snapshot method and apparatus, a metadata tree query method and apparatus, and an electronic device.

According to a first aspect of the present disclosure, a metadata tree snapshot method is provided, the method includes:

- acquiring a basic metadata tree and a first incremental metadata tree, where the basic metadata tree is created based on first snapshot data, the basic metadata tree is locked after being created, the first snapshot data is created at a previous snapshot time instant, and the first incremental metadata tree is created based on a metadata change operation after the basic metadata tree is created,
- locking the first incremental metadata tree in response to reaching a current snapshot time instant; and
- creating second snapshot data based on the basic metadata tree and the locked first incremental metadata tree.

According to a second aspect of the present disclosure, a metadata tree query method is provided, the method includes:

- acquiring a basic metadata tree and a first incremental metadata tree, where the basic metadata tree is created based on first snapshot data, the basic metadata tree is locked after being created, the first snapshot data is created at a previous snapshot time instant, and the first incremental metadata tree is created based on a metadata change operation after the basic metadata tree is created; and
- determining a second metadata query result based on the basic metadata tree and the first incremental metadata tree in response to receiving a second metadata query request.

According to a third aspect of the present disclosure, a metadata tree snapshot apparatus is provided, the apparatus includes:

- a metadata tree acquisition module, configured to acquire a basic metadata tree and a first incremental metadata tree, where the basic metadata tree is created based on first snapshot data, the basic metadata tree is locked after being created, the first snapshot data is created at a previous snapshot time instant, and the first incremental metadata tree is created based on a metadata change operation after the basic metadata tree is created;
- a metadata tree locking module, configured to lock the first incremental metadata tree in response to reaching the current snapshot time instant; and
- a snapshot operation module, configured to create second snapshot data based on the basic metadata tree and the locked first incremental metadata tree.

According to a fourth aspect of the present disclosure, a metadata tree query apparatus is provided, the apparatus includes:

- a metadata tree acquisition module, configured to acquire a basic metadata tree and a first incremental metadata tree, where the basic metadata tree is created based on a first snapshot data, the basic metadata tree is locked after being created, the first snapshot data is created at a previous snapshot time instant, and the first incremental metadata tree is created based on a metadata change operation after the basic metadata tree is created; and
- a metadata query module, configured to determine a second metadata query result based on the basic metadata tree and the first incremental metadata tree in response to receiving a second metadata query request.

According to a fifth aspect of the present disclosure, an electronic device is provided, the electronic device includes:

- at least one processor; and
- a memory in communication with the at least one processor; where,
- the memory stores instructions executable by the at least one processor, and the instructions are executed by the at least one processor to enable the at least one processor to perform the metadata tree snapshot or query method.

According to a sixth aspect of the present disclosure, a non-transitory computer-readable storage medium storing computer instructions is provided, the computer instructions are configured to enable a computer to perform the metadata tree snapshot or query method described above.

According to a seventh aspect of the present disclosure, a computer program product is provided, including a computer program, which, when executed by a processor, implements the metadata tree snapshot or query method described above.

It should be understood that what is described in this section is not intended to identify key or important features of the embodiments of the present disclosure, nor is it intended to limit the scope of the present disclosure. Other features of the present disclosure will be readily understood from the following description.

BRIEF DESCRIPTION OF DRAWINGS

The attached drawings are for a better understanding of this scheme and do not constitute a limitation of the present disclosure.

DESCRIPTION OF EMBODIMENTS

Exemplary embodiments of the present disclosure are described below in combination with the drawings, where various details of the embodiments of the present disclosure are included to facilitate understanding, which should be considered merely exemplary. Thus, a person of ordinary skill in the art should be aware that various changes and modifications may be made to the embodiments described herein without departing from scope and spirit of the present disclosure. Similarly, descriptions of well-known functions and structures are omitted from the following description for the sake of clarity and brevity.

A metadata tree is a tree-type data structure built based on metadata, which is used to implement the management of metadata Snapshot refers to the backup of the system state, which is used to quickly recover to the system state at the snapshot time instant based on snapshot data when the system fails.

The metadata tree requires periodic snapshot operations in order to recover the metadata tree quickly when the system fails. How to effectively create a snapshot of a metadata tree has become an important technical problem.

In the related technology, a metadata tree is usually maintained in memory, during the snapshot operation, a part of the memory used to store the metadata tree needs to be locked, which makes the part of the memory in the system blocked and affects the normal operation of the system.

Figure 1:
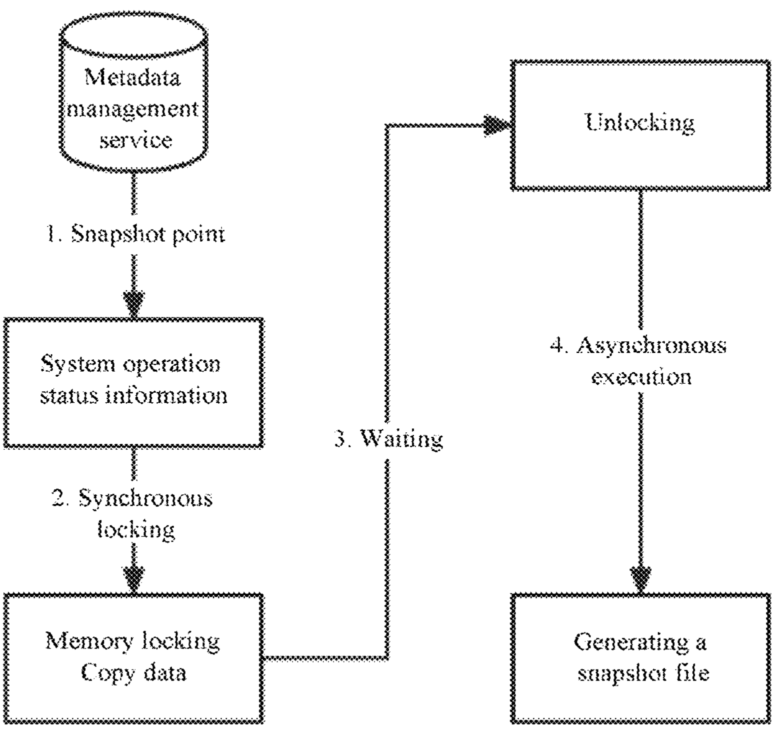
FIG. 1 is a schematic flowchart of a metadata tree snapshot operation in the related art.

FIG. 1 is a schematic flowchart of a metadata tree snapshot operation in the related art. As shown in FIG. 1, a metadata management service is a service used to manage a metadata tree in the system. A snapshot point is a snapshot time instant. System operation status information is the metadata data that reflects the system running status.

In FIG. 1, when the snapshot time instant is reached, a part of memory used to store the metadata tree is locked, and then the metadata tree is copied to the cache. After the metadata tree is copied, the part of the memory used to store the metadata tree can be unlocked, and the snapshot data can be created based on the cached metadata tree.

In the snapshot operation flow shown in FIG. 1, it is necessary to lock a part of memory that stores the metadata tree, during the locking period, this part of the memory in the system is blocked and cannot be written, which affects the normal operation of the system.

In the related art, in order to avoid locking the memory during a snapshot operation of a metadata tree, the following two methods are generally adopted.

Method 1: For the master node that manages the metadata tree, establish a learner based on the distributed consistency protocol (e.g., Paxos protocol, Raft protocol, etc.), periodically perform snapshot operations in the learner, and then persistently store the generated snapshot data. When the metadata tree needs to be recovered, a snapshot file can be pulled from the learner.

Method 2: Store the metadata tree in a storage engine, such as a key-value (key-value) storage engine. In this way, since the storage engine itself is persistent storage, there is no need for additional snapshot data persistence operations.

Although the above methods can avoid locking the memory when snapshot the metadata tree, there are still some shortcomings. In the method 1 above, due to the additional introduction of the learner, the deployment cost of the learner as well as the subsequent operation and maintenance cost are high, and the additional learner also increase the complexity of node management. In the above method 2, the metadata tree is stored in the storage engine, and accessing the metadata tree from the storage engine is much slower than accessing the metadata tree from the memory, resulting in a slow response time of the system.

The metadata tree snapshot method and apparatus, the metadata tree query method and apparatus, and the electronic device provided by the embodiment of the present disclosure aim at solving at least one of the above technical problems in the related art.

Figure 2:
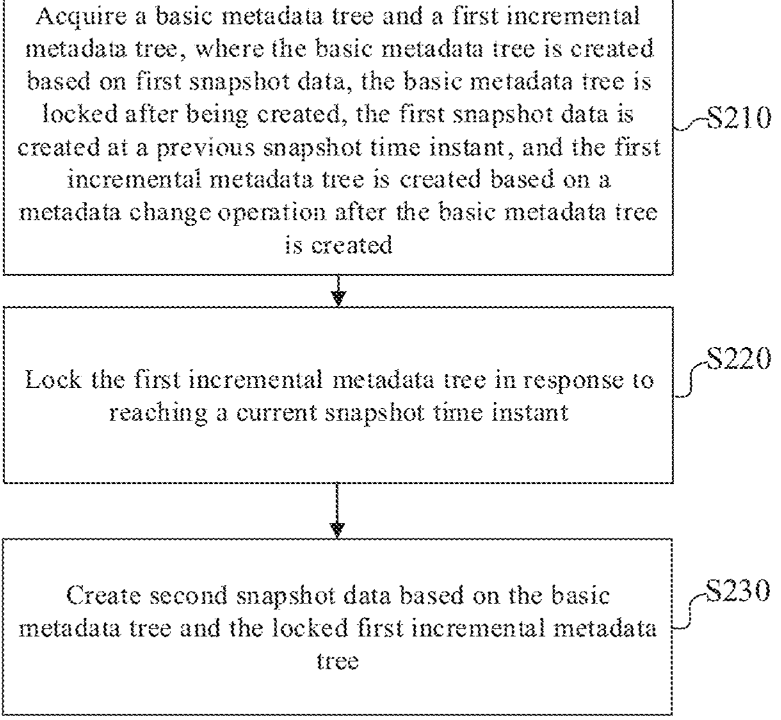
FIG. 2 is a schematic flowchart of a metadata tree snapshot method provided by an embodiment of the present disclosure.

FIG. 2 shows a schematic flowchart of a metadata tree snapshot method provided by an embodiment of the present disclosure. As shown in FIG. 2, the method may mainly include:

Step S210: Acquire a basic metadata tree and a first incremental metadata tree, where the basic metadata tree is created based on first snapshot data, the basic metadata tree is locked after being created, the first snapshot data is created at a previous snapshot time instant, and the first incremental metadata tree is created based on a metadata change operation after the basic metadata tree is created;

Step S220: Lock the first incremental metadata tree in response to reaching a current snapshot time instant, and Step S230: Create second snapshot data based on the basic metadata tree and the locked first incremental metadata tree.

The first snapshot data is the snapshot data created for the metadata tree at the previous snapshot time instant, which can be understood as a mirror file of the metadata tree at the previous snapshot time instant. Based on the first snapshot data, a basic metadata tree can be created, and the basic metadata reflects a metadata state when no change operation occurs after basic metadata is created.

After the basic metadata tree is created, the basic metadata tree is locked, so that the basic metadata tree will not be changed.

In the embodiment of the present disclosure, the first incremental metadata tree can be generated according to a metadata change operation after a basic metadata tree is created. The first incremental metadata tree can reflect a state change of metadata after the basic metadata tree is created.

The metadata change operation can include a metadata add operation and a metadata delete operation.

In the embodiment of the present disclosure, a snapshot time instant can be determined based on a preset snapshot trigger condition. As an example, the snapshot trigger condition is triggered every preset length of time.

In the embodiment of the present disclosure, when the current snapshot time instant is reached, the first incremental metadata tree can be locked, that is, the first incremental metadata tree will not be changed after the current snapshot time instant. At this time, both the basic metadata tree and the first incremental metadata tree are locked, and second snapshot data can be created based on the basic metadata tree and the locked first incremental metadata tree, and the second snapshot data can reflect a metadata state at the current snapshot time instant.

In the embodiment of the present disclosure, the basic metadata tree and the first incremental metadata tree can be maintained in the memory of the system, the basic metadata tree is locked, and the first incremental metadata tree is created based on the metadata change operation. The combination of the basic metadata tree and the first incremental metadata tree can reflect the metadata state in the system and realize metadata management. At the current snapshot time instant, a snapshot can be created based on the basic metadata tree and the locked first incremental metadata tree. The solution can effectively create a snapshot of the metadata tree, and avoid locking the memory, so as to avoid causing system blocking.

In the method provided by the embodiment of the present disclosure, a basic metadata tree and a first incremental metadata tree are acquired, the basic metadata tree is created based on first snapshot data, the basic metadata tree is locked after being created, the first snapshot data is created at the previous snapshot time instant, and the first incremental metadata tree is created based on a metadata change operation after the basic metadata tree is created, the first incremental metadata tree is locked in response to reaching the current snapshot time instant, and second snapshot data is created based on the basic metadata tree and the locked first incremental metadata tree. In this solution, the snapshot data can be created based on the basic metadata tree and the locked first incremental metadata tree, which realizes the effective creation of metadata tree snapshots, avoids memory blocking and ensures the normal operation of the system.

The metadata tree snapshot method provided by the embodiment of the present disclosure can solve the blocking problem caused by memory locking, and can be completed in the master node. Compared with the method of introducing learner in the related art, it can avoid introducing additional learner, avoiding higher deployment cost and operation and maintenance cost, and avoiding increasing the complexity of node management due to additional learner. Compared to the way of storing metadata tree using the storage engine in the related art, this solution is completed in the memory of the master node, which can effectively ensure the reading speed of the metadata tree and ensure the system to have a faster response speed.

The metadata tree in the embodiment of the present disclosure may include, but is not limited to, a directory tree in a distributed file system, a metadata tree formed by metadata corresponding to data shards in a distributed database, and the like.

Figure 3:
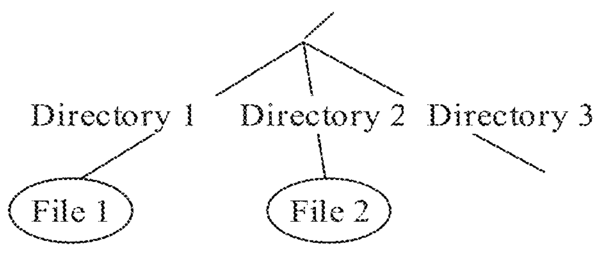
FIG. 3 is a schematic structural diagram of a basic metadata tree provided by an embodiment of the present disclosure.
Figure 4:
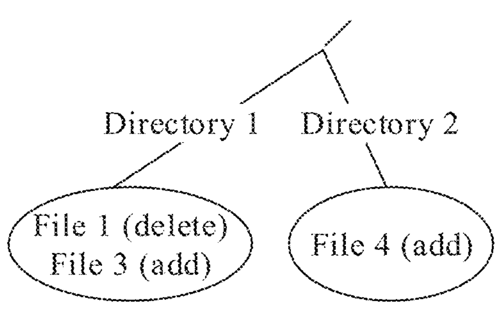
FIG. 4 is a schematic structural diagram of a first incremental metadata tree provided by an embodiment of the present disclosure.

Taking a directory tree as an example, FIG. 3 is a schematic structural diagram of a basic metadata tree provided by an embodiment of the present disclosure. FIG. 4 is a schematic structural diagram of a first incremental metadata tree provided by an embodiment of the present disclosure.

As shown in FIG. 3, the basic metadata tree is a directory tree, including directory 1, directory 2, directory 3, an index node under directory 1 and an index node under directory 2. The index node under directory 1 stores metadata of file 1, and the index node under directory 2 stores metadata of file 2.

As shown in FIG. 4, the first incremental metadata tree includes directory 1, directory 2, directory 3, an index node under directory 1 and an index node under directory 2. The index node under directory 1 stores metadata of file 1 and file 3, and the index node under directory 2 stores metadata of file 4.

As an example, operation types of the metadata operations can also be stored in an index node. As shown in FIG. 4, the index node under directory 1 stores an operation type of delete operation on file 1 and an operation type of add operation on file 3. The index node under directory 2 stores an operation type of add operation on file 4.

In the embodiment of the present disclosure, a basic metadata tree can be generated based on a first snapshot file and a mutation log when system is started. A metadata change operation since the previous snapshot time instant can be recorded in the mutation log, an initial basic metadata tree can be created based on the first snapshot file, and the initial basic metadata tree can be rolled back based on the mutation log to obtain the basic metadata tree.

In an optional method of the present disclosure, after locking the first incremental metadata tree, the method further includes:

creating a second incremental metadata tree based on a metadata change operation after the current snapshot time instant.

In the embodiment of the present disclosure, after locking the first incremental metadata tree, in order to support the normal operation of a metadata change operation in the system, a second incremental metadata tree can be created based on a metadata change operation after the current snapshot time instant.

Through the second incremental metadata tree, a metadata change operation can still be supported without locking the memory during the snapshot operation, so as to maintain a normal operation of the system during the snapshot operation.

In an optional manner of the present disclosure, the method further includes:

determining, in response to receiving a first metadata query request, a first metadata query result based on the basic metadata tree, the first incremental metadata tree and the second incremental metadata tree during a process of creating the second snapshot data.

In the embodiment of the present disclosure, during the process of creating the second snapshot data, the basic metadata tree, the first incremental metadata tree and the second incremental metadata tree are maintained in the memory of the system, and a combination of the basic metadata tree, the first incremental metadata tree and the second incremental metadata tree can reflect the metadata state in the system.

During the process of creating the second snapshot data, if a first metadata query request is received, the first metadata query result can be jointly determined according to the basic metadata tree, the first incremental metadata tree and the second incremental metadata tree.

As an example, the first metadata query request can be a query request for nodes under a certain path in a metadata tree, such as listing the nodes under directory 1 in a metadata tree.

In an optional manner of the present disclosure, nodes of the first incremental metadata tree and nodes of the second incremental metadata tree both store operation types of metadata change operations, and the determining the first metadata query result based on the basic metadata tree, the first incremental metadata tree and the second incremental metadata tree includes:

performing a metadata query on the basic metadata tree to obtain a first subquery result;

performing a metadata query on the first incremental metadata tree to obtain a second subquery result;

performing a metadata query on the second incremental metadata tree to obtain a third subquery result;

merging the first subquery result, the second subquery result and the third subquery result based on operation types stored in nodes included in the second subquery result and operation types stored in nodes included in the third subquery result to obtain a first metadata query result.

In the embodiment of the present disclosure, a basic metadata tree, a first incremental metadata tree and a second incremental metadata tree can be queried respectively according to a first metadata query request to obtain corresponding sub-query results, and then the three sub-query results can be merged based on operation types to obtain the first metadata query result.

The operation types of the change operations can include add operation and delete operation.

Referring to the example in FIG. 4, operation types of the metadata operations are stored in an index node, where the index node under directory 1 stores an operation type of delete operation on file 1, and an operation type of add operation on file 3. An index node under directory 2 stores an operation type of add operation on file 4.

Figure 5:
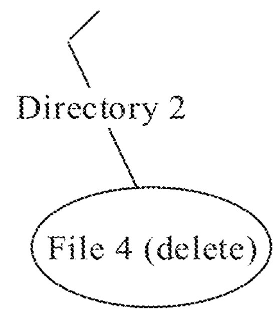
FIG. 5 is a schematic structural diagram of a second incremental metadata tree provided by an embodiment of the present disclosure.

FIG. 5 a schematic structural diagram of a second incremental metadata tree provided by an embodiment of the present disclosure.

As shown in FIG. 5, the second incremental metadata tree includes directory 2 and an index node under directory 2. The index node under directory 2 stores metadata of file 4 and an operation type of delete operation on file 4.

Referring to the examples in FIG. 3, FIG. 4 and FIG. 5, a first metadata query request is to list files in directory 1. Based on the first metadata query request, a first subquery result from the basic metadata tree is file 1. Based on the first metadata query request, a second subquery result from the first incremental metadata tree is to add new file 3, and delete file 1. Based on the first metadata query request, a third sub-query result from the second incremental metadata tree is empty. Merging the first sub-query result, the second sub-query result and the third sub-query result, from the deleted file 1 in the second sub-query result, it can be known that file 1 has been deleted at present, that is, file 1 in the first sub-query result has been deleted, so as to determine that the first metadata query result is file 3.

Referring to the examples in FIG. 3, FIG. 4 and FIG. 5, the first metadata query request is to list files in directory 2. Based on the first metadata query request, the first subquery result from the basic metadata tree is file 2. Based on the first metadata query request, the second subquery result from the first incremental metadata tree is to add new file 4. Based on the first metadata query request, a third subquery result from the second incremental metadata tree is to delete file 4. Merging the first sub-query result, the second sub-query result and the third sub-query result, from the newly added file 4 in the second sub-query result and the deleted file 4 in the third sub-query result, it can be known that the file 4 is currently added first and then deleted, that is, the newly added file 4 in the second sub-query result has been deleted, so as to determine that the first metadata query result is file 2.

In an optional manner of the present disclosure, after completion of the creating of the second snapshot data, the method further includes:

generating a new basic metadata tree based on the second snapshot data, and taking the second incremental metadata tree as a new first incremental metadata tree.

In the embodiment of the present disclosure, after the second snapshot data is generated, a new basic metadata tree can be generated, and the second incremental metadata tree is taken as the new first incremental metadata tree. At the same time, the original basic metadata tree and the original first incremental metadata tree are deleted, that is, the original basic metadata tree is replaced by the new basic metadata tree, and the original first incremental metadata tree is replaced by the new first incremental metadata tree, so that after the snapshot operation is completed, the system is recovered to the state of maintaining a basic metadata tree and a first incremental metadata tree.

In an optional method of the present disclosure, the method further includes:

determining, in response to receiving a second metadata query request, a second metadata query result based on the basic metadata tree and the first incremental metadata tree before the creating of the second snapshot data or after completion of the creating of the second snapshot data.

In the embodiment of the present disclosure, before the creating of the second snapshot data or after completion of the creating of the second snapshot data, that is, when a snapshot operation is not in progress, the combination of a basic metadata tree and a first incremental metadata tree can reflect the metadata state in the system. At this time, if a second metadata query request is received, a second metadata query result can be determined based on the basic metadata tree and the first incremental metadata tree.

As an example, a second metadata query request can be a query request for nodes under a certain path in a metadata tree, such as listing the nodes under directory 1 in a metadata tree.

In an optional manner of the present disclosure, a node of the first incremental metadata tree stores an operation type of metadata change operations, and the determining the second metadata query result based on the basic metadata tree and the first incremental metadata tree includes:

performing a metadata query on the basic metadata tree to obtain a fourth subquery result;

performing a metadata query on the first incremental metadata tree to obtain a fifth subquery result;

merging the fourth subquery result and the fifth subquery result based on an operation type stored in an node included in the fifth subquery result to obtain a second metadata query result.

In the embodiment of the present disclosure, the basic metadata tree and the first incremental metadata tree can be queried respectively according to the second metadata query request to obtain corresponding subquery results, and then the two subquery results are merged based on operation types to obtain the second metadata query result.

Referring to the examples in FIG. 3 and FIG. 4, a second metadata query request is to list files in directory 1. The fourth subquery result from the basic metadata tree based on a first metadata query request is file 1. The fifth subquery result from a first incremental metadata tree based on the second metadata query request is to add new file 3, and delete file 1. Merging the fourth subquery result and the fifth subquery result, from the deleted file 1 in the fifth subquery result, it can be known that file 1 has been deleted at present, that is, file 1 in the fourth subquery result has been deleted, so as to determine that the second metadata query result is file 3.

In an optional manner of the present disclosure, creating the second snapshot data based on the basic metadata tree and the locked first incremental metadata tree includes:

constructing a merged metadata tree based on the basic metadata tree and the locked first incremental metadata tree; and creating the second snapshot data based on the merged metadata tree.

In the embodiment of the present disclosure, when creating the second snapshot data, the basic metadata tree and the locked first incremental metadata tree can be merged to construct a merged metadata tree.

The basic metadata reflects a metadata state when there is no change operation after the basic metadata is created. A first incremental metadata tree can reflect the state change of metadata after the basic metadata tree is created. The basic metadata tree and the locked first incremental metadata tree are merged, and the merged metadata tree can reflect the metadata state in the system at the current snapshot time instant. By creating a snapshot based on the merged metadata tree, the metadata state in the system at the current snapshot time instant can be backed up.

In the embodiment of the present disclosure, the operation of creating the second snapshot data can be performed in the memory of the system, and after completion of the creating of the second snapshot data, the second snapshot data can be persisted, so that the second snapshot data can be obtained in time when the system fails, and the metadata tree at the current snapshot time instant can be quickly recovered based on the second snapshot data.

In the embodiment of the present disclosure, a node of the first incremental metadata tree stores an operation type of a metadata change operation, and the basic metadata tree can be merged with the first incremental metadata tree according to the operation type of the metadata change operation.

Figure 6:
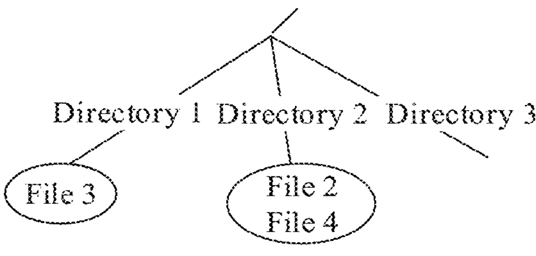
FIG. 6 is a schematic structural diagram of a merged data tree provided by an embodiment of the present disclosure.

As an example, FIG. 6 is a schematic structural diagram of a merged data tree provided by an embodiment of the present disclosure. The merged metadata tree in FIG. 6 is obtained by merging the basic metadata tree in FIG. 3 with the first incremental metadata tree in FIG. 4.

Referring to that examples in FIG. 3 and FIG. 4, the basic metadata tree in FIG. 3 includes directory 1, directory 2, directory 3, an index node under directory 1 and an index node under directory 2. The index node under directory 1 stores metadata of file 1, and the index node under directory 2 stores metadata of file 2. The first incremental metadata tree in FIG. 4 includes directory 1, directory 2, directory 3, an index node under directory 1 and an index node under directory 2. The index node under directory 1 stores metadata of file 1 and file 3, and the index node under directory 2 stores metadata of file 4. The index node under directory 1 stores an operation type of delete operation on file 1, and the operation type of add operation on file 3. The index node under directory 2 stores an operation type of add operation on file 4.

As can be seen from the operation type of the metadata change operation stored in the first incremental metadata tree in FIG. 4, after a basic metadata tree was created, the deletion of file 1 and the addition of files 3 and 4 occurred in the system, so when the basic metadata tree is merged with the first incremental metadata tree, file 1 in the index node under directory 1 in the basic metadata tree in FIG. 3 can be deleted, file 3 is added to the index node under directory 1 in the basic metadata tree in FIG. 3, and file 4 is added to the index node under directory 2 in the basic metadata tree in FIG. 3, thus obtaining the merged metadata tree shown in FIG. 6.

Figure 7:
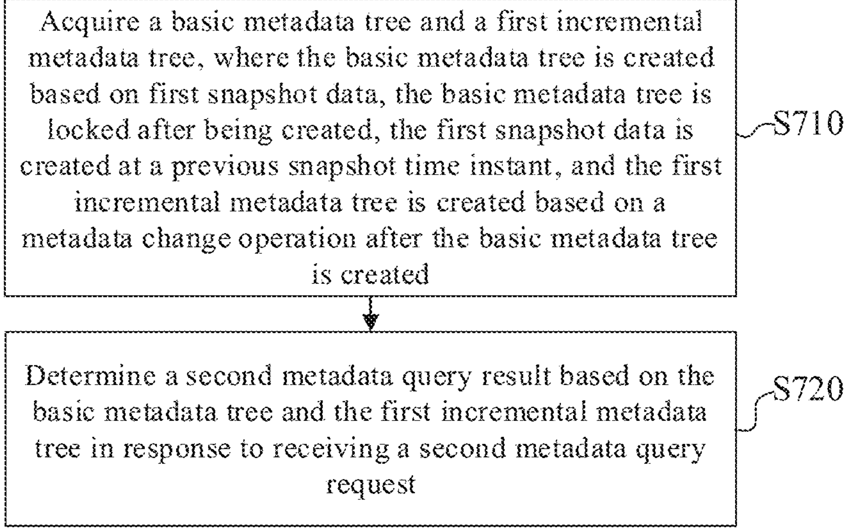
FIG. 7 is a schematic flowchart of a metadata tree query method provided by an embodiment of the present disclosure.

FIG. 7 shows a schematic flowchart of a metadata tree query method provided by an embodiment of the present disclosure. As shown in FIG. 7, the method may mainly include:

Step S710: Acquire a basic metadata tree and a first incremental metadata tree, where the basic metadata tree is created based on first snapshot data, the basic metadata tree is locked after being created, the first snapshot data is created at a previous snapshot time instant, and the first incremental metadata tree is created based on a metadata change operation after the basic metadata tree is created; and Step S720: Determine a second metadata query result based on the basic metadata tree and the first incremental metadata tree in response to receiving a second metadata query request.

The first snapshot data is the snapshot data created for the metadata tree at the previous snapshot time instant, which can be understood as the mirror file of the metadata tree at the previous snapshot time instant. Based on the first snapshot data, a basic metadata tree can be created, and the basic metadata reflects a metadata state when no change operation occurs after basic metadata is created.

After the basic metadata tree is created, the basic metadata tree is locked, so that the basic metadata tree will not be changed.

In the embodiment of the present disclosure, the first incremental metadata tree can be generated according to a metadata change operation after a basic metadata tree is created. The first incremental metadata tree can reflect a state change of metadata after the basic metadata tree is created.

The metadata change operation can include a metadata add operation and a metadata delete operation.

In the embodiment of the present disclosure, when a snapshot operation is not in progress, the basic metadata tree and the first incremental metadata tree can be maintained in the memory of the system, the basic metadata tree is locked, and the first incremental metadata tree is created based on a metadata change operation. The combination of the basic metadata tree and the first incremental metadata tree can reflect the metadata state in the system and realize metadata management. At this time instant, if the second metadata query request is received, the second metadata query result can be determined based on the basic metadata tree and the first incremental metadata tree.

As an example, a second metadata query request may be a query request for nodes under a certain path in a metadata tree. Such as listing the nodes under directory 1 in a metadata tree.

In the method provided by the embodiment of the present disclosure, the basic metadata tree and the first incremental metadata tree are acquired, the basic metadata tree is created based on the first snapshot data, the basic metadata tree is locked after being created, the first snapshot data is created at the previous snapshot time instant, and the first incremental metadata tree is created based on the metadata change operation after the previous snapshot time instant; and in response to receiving the second metadata query request, a second metadata query result is determined based on the basic metadata tree and the first incremental metadata tree. In this solution, the effective management of metadata can be realized based on the basic metadata tree and the first incremental metadata tree, which provides the basis for creating snapshot data, and the metadata query operation can be realized based on the basic metadata tree and the first incremental metadata tree to ensure the normal operation of the system.

In an optional manner of the present disclosure, a node of a first incremental metadata tree store an operation type of a metadata change operation, and the determining the second metadata query result based on the basic metadata tree and the first incremental metadata tree includes:

- performing a metadata query on the basic metadata tree to obtain a fourth subquery result,
- performing a metadata query on the first incremental metadata tree to obtain a fifth subquery result; and
- merging the fourth subquery result and the fifth subquery result based on an operation type stored in an node included in the fifth subquery result to obtain the second metadata query result.

In the embodiment of the present disclosure, a basic metadata tree and a first incremental metadata tree can be queried respectively according to a second metadata query request to obtain corresponding subquery results, and then the two subquery results are merged based on an operation type to obtain a second metadata query result.

Referring to the examples in FIG. 3 and FIG. 4, the second metadata query request is to list files in directory 1. The fourth subquery result from the basic metadata tree based on a first metadata query request is file 1. A fifth subquery result from the first incremental metadata tree based on the second metadata query request is to add new file 3, and delete file 1. Merging the fourth subquery result and the fifth subquery result, from the deleted file 1 in the fifth subquery result, it can be known that file 1 has been deleted at present, that is, file 1 in the fourth subquery result has been deleted, so as to determine that the second metadata query result is file 3.

Figure 8:
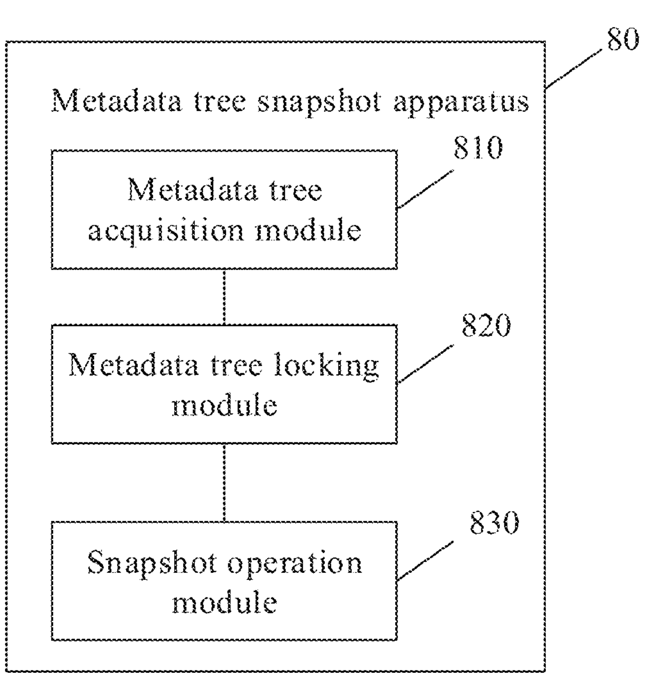
FIG. 8 is a schematic structural diagram of a metadata tree snapshot apparatus provided by an embodiment of the present disclosure.

Based on the same principle as the method shown in FIG. 2, FIG. 8 shows a schematic structural diagram of a metadata tree snapshot apparatus provided by an embodiment of the present disclosure. As shown in FIG. 8, the metadata tree snapshot apparatus 80 can include:

- a metadata tree acquisition module 810, configured to acquire a basic metadata tree and a first incremental metadata tree, where the basic metadata tree is created based on first snapshot data, the basic metadata tree is locked after being created, the first snapshot data is created at a previous snapshot time instant, and the first incremental metadata tree is created based on a metadata change operation after the basic metadata tree is created;
- a metadata tree locking module 820, configured to lock the first incremental metadata tree in response to reaching the current snapshot time instant;
- a snapshot operation module 830, configured to create second snapshot data based on the basic metadata tree and the locked first incremental metadata tree.

In the apparatus provided by the embodiment of the present disclosure, a basic metadata tree and a first incremental metadata tree are acquired, the basic metadata tree is created based on first snapshot data, the basic metadata tree is locked after being created, the first snapshot data is created at the previous snapshot time instant, and the first incremental metadata tree is created based on a metadata change operation after the basic metadata tree is created; the first incremental metadata tree is locked in response to reaching the current snapshot time instant; and second snapshot data is created based on the basic metadata tree and the locked first incremental metadata tree. In this solution, the snapshot data can be created based on the basic metadata tree and the locked first incremental metadata tree, which realizes the effective creation of metadata tree snapshots, avoids memory blocking and ensures the normal operation of the system.

In an implementation, the apparatus further includes:

- a second incremental metadata tree creation module, configured to create a second incremental metadata tree based on a metadata change operation after the current snapshot time instant after locking the first incremental metadata tree.

In an implementation, the apparatus further includes:

- a first metadata query module, configured to determine, in response to receiving a first metadata query request, a first metadata query result based on the basic metadata tree, the first incremental metadata tree and the second incremental metadata tree during a process of creating the second snapshot data.

In an implementation, nodes of the first incremental metadata tree and nodes of the second incremental metadata tree both store operation types of metadata change operations, and when determining the first metadata query result based on the basic metadata tree, the first incremental metadata tree and the second incremental metadata tree, the metadata query module is specifically configured to:

- perform a metadata query on the basic metadata tree to obtain a first subquery result;
- perform a metadata query on the first incremental metadata tree to obtain a second subquery result;
- perform a metadata query on the second incremental metadata tree to obtain a third subquery result; and
- merge the first subquery result, the second subquery result and the third subquery result based on operation types stored in nodes included in the second subquery result and operation types stored in nodes included in the third subquery result to obtain a first metadata query result.

In an implementation, the apparatus further includes:

- a metadata tree updating module, configured to generate a new basic metadata tree based on the second snapshot data and take the second incremental metadata tree as a new first incremental metadata tree, after completion of the creating of the second snapshot data.

In an implementation, the apparatus further includes:

- a second metadata query module, configured to determine, in response to receiving a second metadata query request, a second metadata query result based on the basic metadata tree and the first incremental metadata tree before the creating of the second snapshot data or after completion of the creating of the second snapshot data.

Optionally, a node of the first incremental metadata tree stores an operation type of a metadata change operation, and when determining the second metadata query result based on the basic metadata tree and the first incremental metadata tree, the second metadata query module is specifically configured to:

perform a metadata query on the basic metadata tree to obtain a fourth subquery result;

perform a metadata query on the first incremental metadata tree to obtain a fifth subquery result; and merge the fourth subquery result and the fifth subquery result based on an operation type stored in an node included in the fifth subquery result to obtain the second metadata query result.

In an implementation, the snapshot operation module is specifically configured to:

construct a merged metadata tree based on the basic metadata tree and the locked first incremental metadata tree; and create the second snapshot data based on the merged metadata tree.

Optionally, the basic metadata tree includes any of the followings;

a directory tree in a distributed file system; or a metadata tree composed of metadata corresponding to data shards in a distributed database.

It can be understood that each module of the metadata tree snapshot apparatus in the embodiment of the present disclosure has the function of realizing the corresponding steps of the metadata tree snapshot method in the embodiment shown in FIG. 2. This function can be realized by hardware or by hardware executing corresponding software. The hardware or software includes one or more modules corresponding to the above functions. The above-mentioned modules can be software and/or hardware, and each module can be realized separately or integrated with multiple modules. For the functional description of each module of the above-mentioned metadata tree snapshot apparatus, see the corresponding description of the metadata tree snapshot method in the embodiment shown in FIG. 2, which is not repeated herein.

Figure 9:
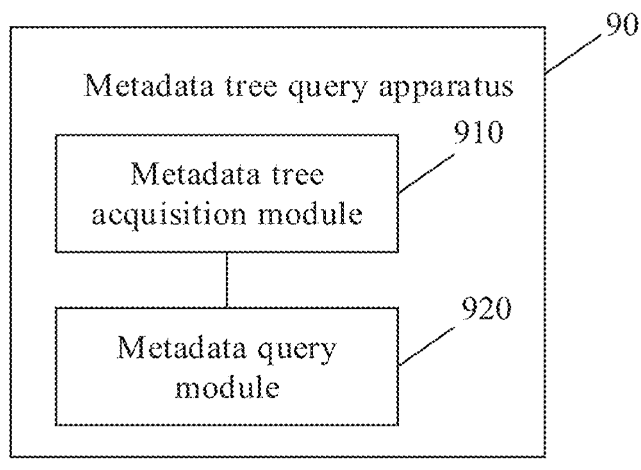
FIG. 9 is a schematic structural diagram of a metadata tree query apparatus provided by an embodiment of the present disclosure.

Based on the same principle as the method shown in FIG. 7, FIG. 9 shows a schematic structural diagram of a metadata tree query apparatus provided by an embodiment of the present disclosure. As shown in FIG. 9, a metadata tree query apparatus 90 may include:

a metadata tree acquisition module 910, configured to acquire a basic metadata tree and a first incremental metadata tree, where the basic metadata tree is created based on a first snapshot data, the basic metadata tree is locked after being created, the first snapshot data is created at a previous snapshot time instant, and the first incremental metadata tree is created based on a metadata change operation after the basic metadata tree is created, and a metadata query module 920, configured to determine a second metadata query result based on the basic metadata tree and the first incremental metadata tree in response to receiving a second metadata query request.

In the apparatus provided by the embodiment of the present disclosure, the basic metadata tree and the first incremental metadata tree are acquired, the basic metadata tree is created based on the first snapshot data, the basic metadata tree is locked after being created, the first snapshot data is created at the previous snapshot time instant, and the first incremental metadata tree is created based on the metadata change operation after the previous snapshot time instant; and in response to receiving a second metadata query request, a second metadata query result is determined based on the basic metadata tree and the first incremental metadata tree. In this solution, the effective management of metadata can be realized based on the basic metadata tree and the first incremental metadata tree, which provides the basis for creating snapshot data, and the metadata query operation can be realized based on the basic metadata tree and the first incremental metadata tree to ensure the normal operation of the system.

In an implementation, a node of a first incremental metadata tree stores an operation type of a metadata change operation, when determining the second metadata query result based on the basic metadata tree and the first incremental metadata tree, the metadata query module is specifically configured to:

perform a metadata query on the basic metadata tree to obtain a fourth subquery result;

perform a metadata query on the first incremental metadata tree to obtain a fifth subquery result;

merge the fourth subquery result and the fifth subquery result based on an operation type stored in a node included in the fifth subquery result to obtain the second metadata query result.

It can be understood that each module of the metadata tree query apparatus in the embodiment of the present disclosure has the function of realizing the corresponding steps of the metadata tree query method in the embodiment shown in FIG. 7. This function can be realized by hardware or by hardware executing corresponding software. The hardware or software includes one or more modules corresponding to the above functions. The above-mentioned modules can be software and/or hardware, and each module can be realized separately or integrated with multiple modules. For the functional description of each module of the metadata tree query apparatus, see the corresponding description of the metadata tree query method in the embodiment shown in FIG. 7, which is not repeated herein.

In the technical solution of the present disclosure, the collection, storage, use, processing, transmission, provision and disclosure of users' personal information all comply with the provisions of relevant laws and regulations, and do not violate public order and good customs.

According to an embodiment of the present disclosure, the present disclosure also provides an electronic device, a readable storage medium and a computer program product.

The electronic device includes, at least one processor, and a memory in communication with the at least one processor; where the memory stores instructions executable by the at least one processor, and the instructions are executed by the at least one processor, to enable the at least one processor to perform the metadata tree snapshot or query method provided by an embodiment of the present disclosure.

Compared to the related art, in the electronic device, the basic metadata tree and the first incremental metadata tree are acquired, the basic metadata tree is created based on first snapshot data, the basic metadata tree is locked after being created, the first snapshot data is created at the previous snapshot time instant, and the first incremental metadata tree is created based on a metadata change operation after the basic metadata tree is created; the first incremental metadata tree is locked in response to reaching the current snapshot time instant; and second snapshot data is created based on the basic metadata tree and the locked first incremental metadata tree. In this solution, the snapshot data can be created based on the basic metadata tree and the locked first incremental metadata tree, which realizes the effective creation of metadata tree snapshots, avoids memory blocking and ensures the normal operation of the system.

The readable storage medium is a non-transitory computer-readable storage medium storing computer instructions, where the computer instructions are used to enable the computer to perform the metadata tree snapshot or query method provided by an embodiment of the present disclosure.

Compared to the related art, in the readable storage medium, the basic metadata tree and the first incremental metadata tree are acquired, the basic metadata tree is created based on first snapshot data, the basic metadata tree is locked after being created, the first snapshot data is created at the previous snapshot time instant, and the first incremental metadata tree is created based on a metadata change operation after the basic metadata tree is created; the first incremental metadata tree is locked in response to reaching the current snapshot time instant; and second snapshot data is created based on the basic metadata tree and the locked first incremental metadata tree. In this solution, the snapshot data can be created based on the basic metadata tree and the locked first incremental metadata tree, which realizes the effective creation of metadata tree snapshots, avoids memory blocking and ensures the normal operation of the system.

The computer program product includes computer program, the computer program executed by a processor for implementing the metadata tree snapshot or query method provided by an embodiment of the present disclosure.

Compared to the related art, in the computer program product, the basic metadata tree and the first incremental metadata tree are acquired, the basic metadata tree is created based on first snapshot data, the basic metadata tree is locked after being created, the first snapshot data is created at the previous snapshot time instant, and the first incremental metadata tree is created based on a metadata change operation after the basic metadata tree is created; the first incremental metadata tree is locked in response to reaching the current snapshot time instant; and second snapshot data is created based on the basic metadata tree and the locked first incremental metadata tree. In this solution, the snapshot data can be created based on the basic metadata tree and the locked first incremental metadata tree, which realizes the effective creation of metadata tree snapshots, avoids memory blocking and ensures the normal operation of the system.

Figure 10:
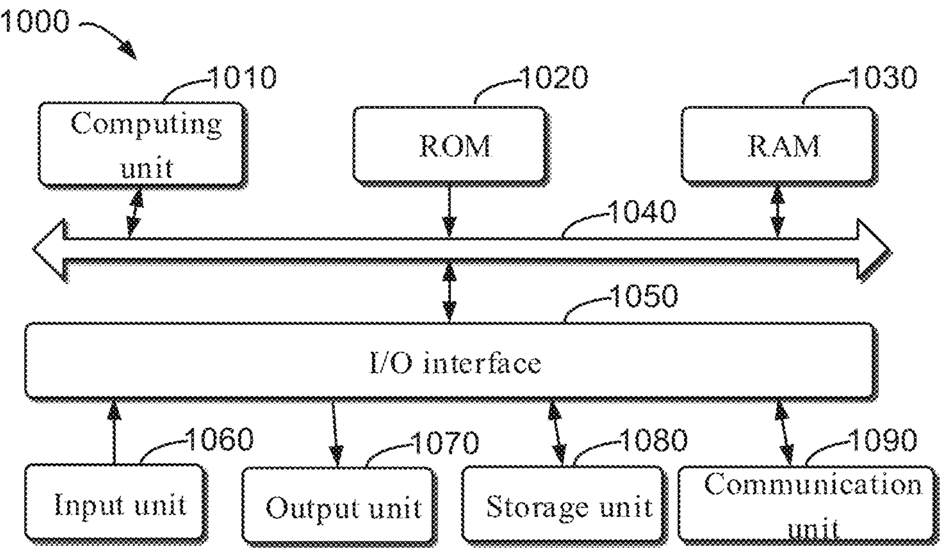
FIG. 10 is a block diagram of an electronic device for implementing a metadata tree snapshot or query method of an embodiment of the present disclosure.

FIG. 10 shows a schematic block diagram of an electronic device 1000 that can be used to implement embodiments of the present disclosure. Electronic devices are intended to represent various forms of digital computers, such as laptop computers, desktop computers, workstations, personal digital assistants, servers, blade servers, mainframe computers, and other suitable computers. Electronic devices can also represent various forms of mobile devices, such as personal digital processing, cellular phones, smart phones, wearable devices and other similar computing devices. The components, their connections and relationships, and their functions are only examples shown in the present disclosure, and are not intended to limit the implementation of the present disclosure described and/or claimed herein.

As shown in FIG. 10, the electronic device 1000 includes a computing unit 1010, which can perform various appropriate actions and processes according to a computer program stored in a read-only memory (ROM) 1020 or a computer program loaded from a storage unit 1080 into a random access memory (RAM) 1030. In the RAM 1030, various programs and data required for the operation of the device 1000 can also be stored. The computing unit 1010, the ROM 1020 and the RAM 1030 are connected to each other through a bus 1040. An input/output (I/O) interface 1050 is also connected to the bus 1040.

A plurality of components in the device 1000 are connected to the I/O interface 1050, including an input unit 1060, such as a keyboard, a mouse and the like; an output unit 1070, such as various types of displays, speakers, etc.; a storage unit 1080, such as a magnetic disk, an optical disk, etc.; and a communication unit 1090, such as a network card, a modem, a wireless communication transceiver, etc. The communication unit 1090 allows the device IWO to exchange information/data with other devices through a computer network such as the Internet and/or various telecommunication networks.

The computing unit 1010 can be various general and/or special processing components with processing and computing capabilities. Some examples of the computing unit 1010 include, but are not limited to, a central processing unit (CPU), a graphics processing unit (GPU), various specialized artificial intelligence (AI) computing chips, various computing units running machine learning model algorithms, a digital signal processor (DSP), and any suitable processor, controller, microcontroller, etc. The computing unit 1010 executes the metadata tree snapshot or query method provided in the embodiment of the present disclosure. For example, in some embodiments, executing the metadata tree snapshot or query method provided in the embodiments of the present disclosure can be implemented as a computer software program, which tangibly embodied in a machine-readable medium, such as the storage unit 1080. In some embodiments, part or all of the computer program can be loaded and/or installed on the device 1000 via the ROM 1020 and/or the communication unit 1090. When the computer program is loaded into the RAM 1030 and executed by the computing unit 1010, one or more steps of the metadata tree snapshot or query method provided in the embodiment of the present disclosure may be executed. Alternatively, in other embodiments, the computing unit 1010 can be configured to execute the metadata tree snapshot or query method provided in the embodiment of the present disclosure by any other suitable means (for example, by means of firmware).

Various embodiments of the systems and techniques described above herein can be implemented in digital electronic circuitry, integrated circuit systems, field programmable gate arrays (FPGA), application specific integrated circuits (ASIC), application specific standard products (ASSP), system on chip (SOC), complex programmable logic devices (CPLD), computer hardware, firmware, software, and/or combinations thereof. These various embodiments may include being implemented in one or more computer programs that can be executed and/or interpreted on a programmable system including at least one programmable processor, which may be a special-purpose or general-purpose programmable processor and can receive data and instructions from a storage system, at least one input device, and at least one output device, and transmit data and instructions to the storage system, the at least one input device, and the at least one output device.

The program code for implementing the method of the present disclosure can be written in any combination of one or more programming languages. These program codes may be provided to a processor or controller of a general-purpose computer, a special-purpose computer or other programmable data processing apparatus, so that the program codes, when executed by the processor or controller, cause the functions/operations specified in the flowcharts and/or block diagrams to be implemented. The program code can be completely executed on a machine, partially executed on a machine, partially executed on a machine as a separate software package and partially executed on a remote machine or completely executed on a remote machine or server.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. A machine-readable medium may include, but is not limited to, an electronic, magnetic, optical, electromagnetic, infrared, or semiconductor system, device or equipment, or any suitable combination of the above. More specific examples of the machine-readable storage medium may include an electrical connection based on one or more lines, a portable computer disk, a hard disk, a RAM a read-only memory (ROM), an erasable programmable read-only memory (EPROM or flash memory), an optical fiber, a convenient compact disk read-only memory (CD-ROM), an optical storage device, a magnetic storage device, or any suitable combination of the above.

To provide interaction with a user, the systems and the techniques described herein may be implemented on a computer having: a display apparatus (e.g., a CRT (cathode ray tube) or LCD (liquid crystal display) monitor) configured to display information to the user; and a keyboard and a pointing apparatus (e.g., a mouse or a trackball) by which the user can provide input to the computer. Other kinds of apparatuses may also be used to provide interaction with the user: for example, a feedback provided to the user may be any form of sensory feedback (e.g., a visual feedback, an auditory feedback, or a haptic feedback); and input from the user may be received in any form (including acoustic input, voice input, or, haptic input).

The systems and the techniques described herein may be implemented in a computing system which includes a back-end component (e.g., as a data server), or a computing system which includes a middleware component (e.g., an application server), or a computing system which includes a front-end component (e.g., a user computer having a graphical user interface or a web browser through which a user can interact with the systems and the techniques described herein), or a computing system which includes any combination of such back-end component, middleware component, or front-end component. Components of a system may be interconnected by digital data communication (e.g., a communication network) in any form or medium. Examples of the communication network include: a local area network (LAN), a wide area network (WAN), and the Internet.

A computer system may include a client and a server. The client and server are generally far away from each other and usually interact through a communication network. The relationship between client and server is generated by computer programs running on corresponding computers and having a client-server relationship with each other. The server can be a cloud server, a distributed system server, or a server combined with a blockchain.

It should be understood that various forms of the processes shown above may be used, with steps reordered, added or deleted. For example, steps recited in the present disclosure may be executed in parallel or sequentially or in a different order, as long as desired results of technical solutions disclosed in the present disclosure can be achieved, and are not limited herein.

The aforementioned embodiments do not constitute a limitation on protection scope of the present disclosure. It should be apparent to those skilled in the art that various modifications, combinations, sub-combinations and substitutions may be made depending on design requirements and other factors. Any modifications, equivalent substitutions and improvements made within spirit and principles of the present disclosure should be contained in the protection scope of the present disclosure.

The invention claimed is:

1. A metadata tree snapshot method, comprising:

acquiring a basic metadata tree and a first incremental metadata tree, wherein the basic metadata tree is created based on first snapshot data, the basic metadata tree is locked after being created, the first snapshot data is created at a previous snapshot time instant, and the first incremental metadata tree is created based on a metadata change operation after the basic metadata tree is created;

locking the first incremental metadata tree in response to reaching a current snapshot time instant; and creating second snapshot data based on the basic metadata tree and the locked first incremental metadata tree;

wherein after the locking the first incremental metadata tree, the method further comprises:

creating a second incremental metadata tree based on a metadata change operation after the current snapshot time instant and before completion of the creating the second snapshot data.

2. The method according to claim 1, further comprising:

determining, in response to receiving a first metadata query request, a first metadata query result based on the basic metadata tree, the first incremental metadata tree and the second incremental metadata tree during a process of creating the second snapshot data.

3. The method according to claim 2, wherein nodes of the first incremental metadata tree and nodes of the second incremental metadata tree both store operation types of metadata change operations, and the determining the first metadata query result based on the basic metadata tree, the first incremental metadata tree and the second incremental metadata tree comprises:

performing a metadata query on the basic metadata tree to obtain a first subquery result;

performing a metadata query on the first incremental metadata tree to obtain a second subquery result;

performing a metadata query on the second incremental metadata tree to obtain a third subquery result; and merging the first subquery result, the second subquery result and the third subquery result based on operation types stored in nodes comprised in the second subquery result and operation types stored in nodes comprised in the third subquery result to obtain a first metadata query result.

4. The method according to claim 1, wherein after completion of the creating of the second snapshot data, the method further comprises:

generating a new basic metadata tree based on the second snapshot data, and taking the second incremental metadata tree as a new first incremental metadata tree.

5. The method according to claim 1, further comprising:

determining, in response to receiving a second metadata query request, a second metadata query result based on the basic metadata tree and the first incremental metadata tree before the creating of the second snapshot data or after completion of the creating of the second snapshot data.

6. The method according to claim 5, wherein a node of the first incremental metadata tree stores an operation type of a metadata change operation, and the determining the second metadata query result based on the basic metadata tree and the first incremental metadata tree comprises:

performing a metadata query on the basic metadata tree to obtain a fourth subquery result;

performing a metadata query on the first incremental metadata tree to obtain a fifth subquery result; and merging the fourth subquery result and the fifth subquery result based on an operation type stored in a node comprised in the fifth subquery result to obtain the second metadata query result.

7. The method according to claim 1, wherein the creating the second snapshot data based on the basic metadata tree and the locked first incremental metadata tree comprises:

constructing a merged metadata tree based on the basic metadata tree and the locked first incremental metadata tree; and creating the second snapshot data based on the merged metadata tree.

8. The method according to claim 1, wherein the basic metadata tree comprises any one of the following:

a directory tree in a distributed file system; or a metadata tree composed of metadata corresponding to data shards in a distributed database.

9. A metadata tree query method, comprising:

acquiring a basic metadata tree, a first incremental metadata tree and a second incremental metadata tree, wherein the basic metadata tree is created based on first snapshot data, the basic metadata tree is locked after being created, the first snapshot data is created at a previous snapshot time instant, and the first incremental metadata tree is created based on a metadata change operation after the basic metadata tree is created, and is locked during a process of creating snapshot data, the second incremental metadata tree is created based on a metadata change operation during the process of creating snapshot data; and during the process of creating snapshot data, determining a first metadata query result based on the basic metadata tree, the first incremental metadata tree and the second incremental metadata tree in response to receiving a first metadata query request.

10. The method according to claim 9, wherein nodes of the first incremental metadata tree and nodes of the second incremental metadata tree both store operation types of metadata change operations, and the determining the first metadata query result based on the basic metadata tree, the first incremental metadata tree and the second incremental metadata tree comprises:

performing a metadata query on the basic metadata tree to obtain a first subquery result;

performing a metadata query on the first incremental metadata tree to obtain a second subquery result;

performing a metadata query on the second incremental metadata tree to obtain a third subquery result; and merging the first subquery result, the second subquery result and the third subquery result based on operation types stored in nodes comprised in the second subquery result and operation types stored in nodes comprised in the third subquery result to obtain the first metadata query result.

11. A metadata tree snapshot apparatus, comprising:

at least one processor; and a memory communicatively connected to the at least one processor; wherein the memory stores an instruction executable by the at least one processor, and the instruction is executed by the at least one processor to enable the at least one processor to:

acquire a basic metadata tree and a first incremental metadata tree, wherein the basic metadata tree is created based on first snapshot data, the basic metadata tree is locked after being created, the first snapshot data is created at a previous snapshot time instant, and the first incremental metadata tree is created based on a metadata change operation after the basic metadata tree is created;

lock the first incremental metadata tree in response to reaching a current snapshot time instant;

create second snapshot data based on the basic metadata tree and the locked first incremental metadata tree; and after locking the first incremental metadata tree, create a second incremental metadata tree based on a metadata change operation after the current snapshot time instant and before completion of the creating the second snapshot data.

12. The apparatus according to claim 11, wherein the at least one processor is further enabled to:

determine, in response to receiving a first metadata query request, a first metadata query result based on the basic metadata tree, the first incremental metadata tree and the second incremental metadata tree during a process of creating the second snapshot data.

13. The apparatus according to claim 12, wherein nodes of the first incremental metadata tree and nodes of the second incremental metadata tree both store operation types of metadata change operations, and when determining the first metadata query result based on the basic metadata tree, the first incremental metadata tree and the second incremental metadata tree, the at least one processor is specifically enabled to:

perform a metadata query on the basic metadata tree to obtain a first subquery result;

perform a metadata query on the first incremental metadata tree to obtain a second subquery result;

perform a metadata query on the second incremental metadata tree to obtain a third subquery result; and merge the first subquery result, the second subquery result and the third subquery result based on operation types stored in nodes comprised in the second subquery result and operation types stored in nodes comprised in the third subquery result to obtain a first metadata query result.

14. The apparatus according to claim 11, wherein the at least one processor is further enabled to:

generate a new basic metadata tree based on the second snapshot data and take the second incremental metadata tree as a new first incremental metadata tree, after completion of the creating of the second snapshot data.

15. A metadata tree query apparatus, comprising:

at least one processor; and a memory communicatively connected to the at least one processor; wherein the memory stores an instruction executable by the at least one processor, and the instruction is executed by the at least one processor to enable the at least one processor to perform the method according to claim 1.

16. The apparatus according to claim 15, wherein a node of the first incremental metadata tree store an operation type of a metadata change operation, and the at least one processor is further enabled to:

perform a metadata query on the basic metadata tree to obtain a fourth subquery result;

perform a metadata query on the first incremental metadata tree to obtain a fifth subquery result; and merge the fourth subquery result and the fifth subquery result based on an operation type stored in a node comprised in the fifth subquery result to obtain the second metadata query result.

17. A non-transitory computer-readable storage medium storing computer instructions, wherein the computer instructions are used to enable a computer to perform the method according to claim 1.

18. A non-transitory computer-readable storage medium storing computer instructions, wherein the computer instructions are used to enable a computer to perform the method according to claim 9.

* * * * *